United States Patent Office 2,895,840
Patented July 21, 1959

2,895,840

KILN REFRACTORY

Curtis D. Ortman, Swartz Creek, Mich., assignor to General Motors Corporation, Detroit, Mich., a corporation of Delaware No Drawing. Application November 8, 1957
Serial No. 695,201

9 Claims. (Cl. 106—68)

This invention relates to kiln refractories and is a continuation-in-part of application for United States Letters Patent Serial Number 538,276, filed October 3, 1955, now abandoned. Its object is the provision of an improved, more economical kiln refractory material having increased heat resistance and a longer useful life. Another object of the invention is to provide a more economical process for manufacturing refractories having high heat resistance and durability. The compositions of this invention find particular utility as kiln refractories and furniture for tunnel kilns used in the manufacture of spark plug insulators and similar ceramic articles.

I have found that kiln saggers and kiln car tops made by casting and subsequently drying and then firing at sintering temperature a raw batch consisting essentially of about from 66% to 78% Tabular corundum, from 4% to 12% clay and from 10% to 28% mullite, possess superior heat resistance and durability to refractories heretofore used. Of the total Tabular corundum content, from about 25% to 45% should have a grain size in the range of about ⅛ to ¼ inch; from about 15% to 35%, an intermediate grain size, that is a grain size between about 14 and 325 mesh; and from about 20% to 45% substantially all less than about 325 mesh. Grain sizes and proportions of ingredients are, of course, important to the high quality of the finished refractory article. Also, it is particularly important that the corundum be in the form known as Tabular corundum, presently available on the commercial market from the Aluminum Company of America. Chemically, Tabular corundum is, of course, aluminum oxide with a small amount of incidental impurity. However, it is characterized and distinguishable from other types of corundum in that it consists of sharply angular grains which are a composite of intergrown crystals and fragments of crystals of various sizes (from about 5 microns to as much as 40 microns). This grain structure contributes greatly to the durability and high heat resistance of the articles manufactured.

In addition to the above-specified ingredients, the raw batch also includes sufficient water, preferably no more than is needed, to provide flowability for the casting operation and may also include a small amount of a suitable deflocculating agent to assist in obtaining a fluid uniform mixture for the casting operation. Sodium phosphate has been found to be especially suitable as a deflocculating agent.

Preferred refractories may be made in accordance with the invention from either of the following two raw batches formed by mixing the listed ingredients in the proportions indicated.

| Raw batch ingredient: | Parts by weight |
|---|---|
| Tabular corundum—⅛ in. to ¼ in. grain | 30 |
| Tabular corundum—14 mesh (and fines) | 20 |
| Tabular corundum—2% on 325 mesh screen | 7 |
| Tabular corundum—.3% to .5% on 325 mesh screen | 15 |
| Synthetic mullite—6 mesh (and fines) | 20 |
| No. 1 Ware Clay | 4 |

Typical chemical analysis:
  $SiO_2$, 25.05%
  $Al_2O_3$, 73.07%
  $Fe_2O_3$, .34%
  $TiO_2$, .45%
  CaO, .04%
  MgO, .21%
  Alkali, .41%
  Ign. loss, .04%

| | Parts by weight |
|---|---|
| No. 1 Ware Clay | 4 |

Typical chemical analysis:
  Ign. loss, 13.61%
  $SiO_2$, 45.05%
  $Al_2O_3$, 39.6%
  $Fe_2O_3$, .58%
  $TiO_2$, .80%
  CaO, .09%
  MgO, .24%
  $Na_2O$, $K_2O$, .63%

| | |
|---|---|
| Florida kaolin | 4 |

Typical chemical analysis:
  $SiO_2$, 45.9%
  $Al_2O_3$, 38.04%
  $Fe_2O_3$, 1.14%
  $TiO_2$, .40%
  CaO, .56%
  MgO, .25%
  $Na_2O$, .13%
  $K_2O$, .40%
  Ign. loss, 13.82%

| | |
|---|---|
| Water | Approximately 8 |
| $Na_6P_4O_{13}$ | .2 |

| Raw batch ingredient: | Parts by weight |
|---|---|
| Tabular corundum—⅛ in. to ¼ in. grain | 30 |
| Tabular corundum—14 mesh (and fines) | 15 |
| Tabular corundum—2% on 325 mesh screen | 27 |
| Synthetic mullite—6 mesh (and fines) | 20 |
| No. 1 Ware Clay | 4 |
| Florida kaolin | 4 |
| Water | Approximately 8 |
| $Na_6P_4O_{13}$ | .2 |

Obviously, the water content can vary, it only being necessary that it be sufficient to allow filling of the material into molds. As indicated above, it is preferable to use only such amount of water as is required for the casting operation. It is sometimes found advantageous to include in the batch a small amount of charcoal to improve the casting qualities and prevent sticking to the molds. If desired, some of the clay may be added as kaolin, as in the above examples, to aid castability. Also, fused mullite, calcined synthetic mullite, or the mullite forming materials sillimanite and calcined kyanite may be substituted in whole or in part for the synthetic mullite. Thus, the term "mullite" as used herein and more particularly in the claims is intended to cover the various forms of mullite as well as kyanite and sillimanite which, upon calcination or heating, convert to mullite. A typical analysis of a fused mullite which may be used in place of the syntheitc mullite specified in the above example is as follows:

| | Percent |
|---|---|
| $Al_2O_3$ | 76.17 |
| $SiO_2$ | 20.08 |
| $TiO_2$ | 2.51 |
| $Fe_2O_3$ | .87 |
| $P_2O_5$ | .04 |
| CaO, MgO | Trace |
| Alkalis | .08 |

Kiln refractories can be advantageously manufactured from the raw batch in the following manner. The uniformly mixed raw bath, for example either of the batches indicated above, is fed into porous plaster molds of the desired shape and size. It is preferable to vibrate the molds during this casting operation in order to avoid air pockets. After sufficient water has been removed from the piece to provide rigidity, by absorption into the plaster mold or by evaporation, the shaped article may be removed. Usually about 40 minutes or more standing time in the molds is required to provide sufficient rigidity to allow removal. After removal from the molds the cast articles are dried at a temperature of not more than about 200° F., the usual drying time required being from 12 to 16 hours or longer depending on the size and shape of the pieces being made. They are then fired at a temperature on the order of from cone 14 to 30, for example, at about 2570° F. on a 13-hour schedule, to sinter the cast article into a dense coherent body.

The sintered kiln refractories manufactured in accordance with my invention have been found to possess superior qualities of heat resistance and durability thereby effecting considerable savings in kiln maintenance costs. Saggers and kiln car tops made of the refractory have been found to possess a useful life of about three times that of the pressed-type 100% corundum refractories previously used.

It is to be understood that while the invention has been described chiefly by reference to particular embodiments thereof, it is not so limited since various changes and modifications may be made, all within the full and intended scope of the claims which follow.

I claim:

1. A refractory article made by casting and subsequently drying and then firing at sintering temperature a raw batch consisting essentially of about from 66% to 78% corundum, from 4% to 12% clay and from 10% to 28% mullite, said corundum being characterized by sharply angular grains which are a composite of intergrown crystals and fragments of crystals of various sizes, at least about 25% of said corundum having a relatively large grain size of about ⅛ to ¼ inch, at least about 15% of said corundum having an intermediate grain size of from about 14 to 325 mesh and at least about 20% of said corundum having a relatively small gain size of less than about 325 mesh.

2. A refractory article made by casting and subsequently drying and then firing at sintering temperature a raw bath consisting essentially of about from 66% to 78% corundum, from 4% to 12% clay and from 10% to 28% mullite, said corundum being characterized by sharply angular grains which are a composite of intergrown crystals and fragments of crystals of various sizes, about 25% to 45% of said corundum having a relatively large grain size of from about ⅛ to ¼ inch, about 15% to 35% of said corundum having an intermediate grain size of from about 14 to 325 mesh and about 20% to 45% of said corundum having a relatively small grain size of less than about 325 mesh.

3. A refractory article made by casting and subsequently drying and then firing a sintering temperature a raw batch consisting essentially of about 72% corundum, about 8% clay and about 20% mullite, said corundum being characterized by sharply angular grains which are a composite of intergrown crystals and fragments of crystals of various sizes, about 25% to 45% of said corundum having a relatively large grain size of from about ⅛ to ¼ inch, about 15% to 35% of said corundum having an intermediate grain size of from about 14 to 325 mesh and about 20% to 45% of said corundum having a relatively small grain size of less than about 325 mesh.

4. A refractory article made by casting and subsequently drying and then firing at a temperature from about cone 14 to cone 30 a raw batch formed by mixing the following ceramic ingredients in the proportions indicated in terms of parts by weight:

Corundum—⅛ in. to ¼ in. grain _____ About 30
Corundum—14 mesh (and fines) _____ About 20
Corundum—2% on 325 mesh screen _____ About 7
Corundum—.3% to .5% on 325 mesh screen _ About 15
Mullite—6 mesh (and fines) _____ About 20
Clay _____ About 4
Kaolin _____ About 4 all of said corundum being characterized by sharply angular grains which are a composite of intergrown crystals and fragments of crystals of various sizes.

5. A refractory article made by casting and subsequently drying and then firing at a temperature from about cone 14 to cone 30 a raw batch formed by mixing the following ceramic ingredients in the proportions indicated in terms of parts by weight:

Corundum—⅛ in. to ¼ in. grain _____ About 30
Corundum—14 mesh (and fines) _____ About 15
Corundum—2% on 325 mesh screen _____ About 27
Mullite—6 mesh (and fines) _____ About 20
Clay _____ About 4
Kaolin _____ About 4 all of said corundum being characterized by sharply angular grains which are a composite of intergrown crystals and fragments of crystals of various sizes.

6. A method for manufacturing a refractory article comprising the steps of forming a raw batch consisting essentially of ceramic plus sufficient water to render the batch flowable, said ceramic being a mixture of about from 66% to 78% corundum, from 4% to 12% clay and from 10% to 28% mullite, the corundum being characterized by sharply angular grains which are a composite of intergrown crystals and fragments of crystals of various sizes, at least about 25% of said corundum having a relatively large grain size from about ⅛ to ¼ inch, at least about 15% of said corundum having an intermediate grain size of from about 14 to 325 mesh and at least about 20% of said corundum having a relatively small grain size of less than about 325 mesh, forming a casting from said raw batch, drying said casting and then firing said casting at sintering temperature.

7. A method for manufacturing a refractory article comprising the steps of forming a raw batch consisting essentially of ceramic plus sufficient water to render the batch flowable, said ceramic being a mixture of about from 66% to 78% corundum, from 4% to 12% clay and from 10% to 28% mullite, the corundum being characterized by sharply angular grains which are a composite of intergrown crystals and fragments of crystals of various sizes, about 25% to 45% of said corundum having a relatively large grain size from about ⅛ to ¼ inch, about 15% to 35% of said corundum having an intermediate grain size of from about 14 to 325 mesh and about 20% to 45% of said corundum having a relatively small grain size of less than about 325 mesh, forming a casting from said raw batch, drying said casting and then firing said casting at sintering temperature.

8. A method for making a refractory article comprising the steps of forming a raw batch by mixing the following ingredients in the proportions indicated in terms of parts by weight:

Corundum—⅛ in. to ¼ in. grain _____ About 30
Corundum—14 mesh (and fines) _____ About 20
Corundum—2% on 325 mesh screen _____ About 7
Corundum—.3% to .5% on 325 mesh screen About 15
Mullite—6 mesh (and fines) _____ About 20
Clay _____ About 4
Kaolin _____ About 4
Water _____ About 8
Sodium phosphate _____ About .2 all of said corundum being characterized by sharply angular grains which are a composite of intergrown crystals and fragments of crystals of various sizes, forming a casting from said raw batch, drying said casting and then firing said casting at a temperature of from about cone 14 to cone 30.

9. A method for making a refractory article comprising the steps of forming a raw batch by mixing the following ingredients in the proportions indicated in terms of parts by weight:

| | |
|---|---|
| Corundum—⅛ in. to ¼ in. grain | About 30 |
| Corundum—14 mesh (and fines) | About 15 |
| Corundum—2% on 325 mesh screen | About 27 |
| Mullite—6 mesh (and fines) | About 20 |
| Clay | About 4 |
| Kaolin | About 4 |
| Water | About 8 |
| Sodium phosphate | About .2 | all of said corundum being characterized by sharply angular grains which are a composite of intergrown crystals and fragments of crystals of various sizes, forming a casting from said raw batch, drying said casting and then firing said casting at a temperature of from about cone 14 to cone 30.

References Cited in the file of this patent
UNITED STATES PATENTS

| | | |
|---|---|---|
| 1,897,183 | White | Feb. 14, 1933 |
| 2,118,798 | Saxe | May 24, 1938 |